United States Patent [19]
Ouellet

[11] 3,994,103
[45] Nov. 30, 1976

[54] INFLATABLE DOCK SEAL
[75] Inventor: Wilfred P. Ouellet, Cranston, R.I.
[73] Assignee: Bondor Manufacturing Company, Providence, R.I.
[22] Filed: Oct. 20, 1975
[21] Appl. No.: 624,177

[52] U.S. Cl. .................................. 52/2; 52/173 DS
[51] Int. Cl.² ........................................ E06B 7/22
[58] Field of Search .................... 52/2, 173; 49/477; 138/159, 128

[56] References Cited
UNITED STATES PATENTS

| | | | |
|---|---|---|---|
| 2,717,540 | 9/1955 | Planer ............................. | 49/477 X |
| 3,303,615 | 2/1967 | O'Neal ............................. | 52/2 |
| 3,391,502 | 7/1968 | O'Neal ............................. | 52/2 |
| 3,391,503 | 7/1968 | O'Neal ............................. | 52/2 |
| 3,557,508 | 1/1971 | Frommelt et al. ............... | 52/173 DS |
| 3,714,745 | 2/1973 | O'Neal ............................. | 52/2 |
| 3,854,257 | 12/1974 | Lobel .............................. | 52/173 DS |
| 3,939,614 | 2/1976 | Fommelt et al. ................ | 52/2 |

FOREIGN PATENTS OR APPLICATIONS

| | | | |
|---|---|---|---|
| 240,891 | 10/1962 | Australia .......................... | 52/2 |

Primary Examiner—Alfred C. Perham
Attorney, Agent, or Firm—Salter & Michaelson

[57] ABSTRACT

A docking seal for a loading dock opening in a wall, comprising a rigid backing for attachment to the wall about the opening and a yieldable facing held distended therefrom by air pressure introduced between the rigid backing and yieldable facing such as to form a continuous air chamber peripherally of the opening wherein the back wall of the chamber is constituted solely by the rigid backing and the front and side walls by the yieldable facing. The rigid backing comprises three frame members for disposition across the top and along the sides of the opening, hinged at adjacent ends to enable folding the frame members in a superimposed relation with the deflated facing secured thereto, so that the seal may be shipped and/or stored in collapsed condition.

12 Claims, 11 Drawing Figures

INFLATABLE DOCK SEAL

BACKGROUND OF THE INVENTION

Inflatable dock seals are the subject matter of the O'Neal U.S. Pat. Nos. 3,303,615; 3,391,502; 3,391,503; and 3,714,745 and of the Sciolino U.S. Pat. No. 3,500,599. The structures shown in all of these patents are of complicated make-up, required special installation techniques and are expensive to maintain. The structure disclosed herein is designed to simplify and make less expensive manufacture and installation and to provide a structure which can be completed at its place of manufacture, ready for installation, and folded into a compact package, to facilitate shipping.

SUMMARY OF THE INVENTION

As herein illustrated the docking seal comprises a rigid backing for attachment to the wall about the docking opening and a yieldable facing held distended therefrom by air pressure introduced between the backing and the facing such as to form a continuous air chamber peripherally of the opening and wherein the back wall of the chamber is constituted solely by the rigid backing and the front and side walls by the yieldable facing. An opening may be provided in one of the walls of the yieldable facing or in the rigid backing through which low-pressure air may be introduced to hold the yieldable facing distended. The rigid backing comprises three frame members, i.e., a top frame member and two side frame members, the upper ends of the side frame members being hinged to the opposite ends of the top frame member so that the side frame members may be folded onto the top member. The flexible facing comprises a length of vinyl-coated nylon fabric tailored to form a length coextensive with the top and sides of the frame members and is attached at its edges to the frame members by means of U-shaped trim strips through which attaching elements are inserted for attaching the entire structure to the wall about the docking opening. The inner edges of the frame members may coincide with the periphery of the opening, or the inner edges of the frame members may extend inwardly therefrom to reduce the size of the docking opening. Optionally, there may be a second yieldable facing attached to the first yieldable facing to provide a second air chamber forwardly of the first air chamber around the entire opening, and when so constructed there are openings in the front wall of the first chamber through which air supplied to the first chamber is simultaneously supplied to the second chamber. A valance strip may also be applied across the top of the opening and inflated when desired through a connection to the first chamber.

DESCRIPTION OF THE DRAWINGS

The invention will now be described in greater detail with reference to the accompanying drawings, wherein.

DESCRIPTION OF THE INVENTION

Figure 1:
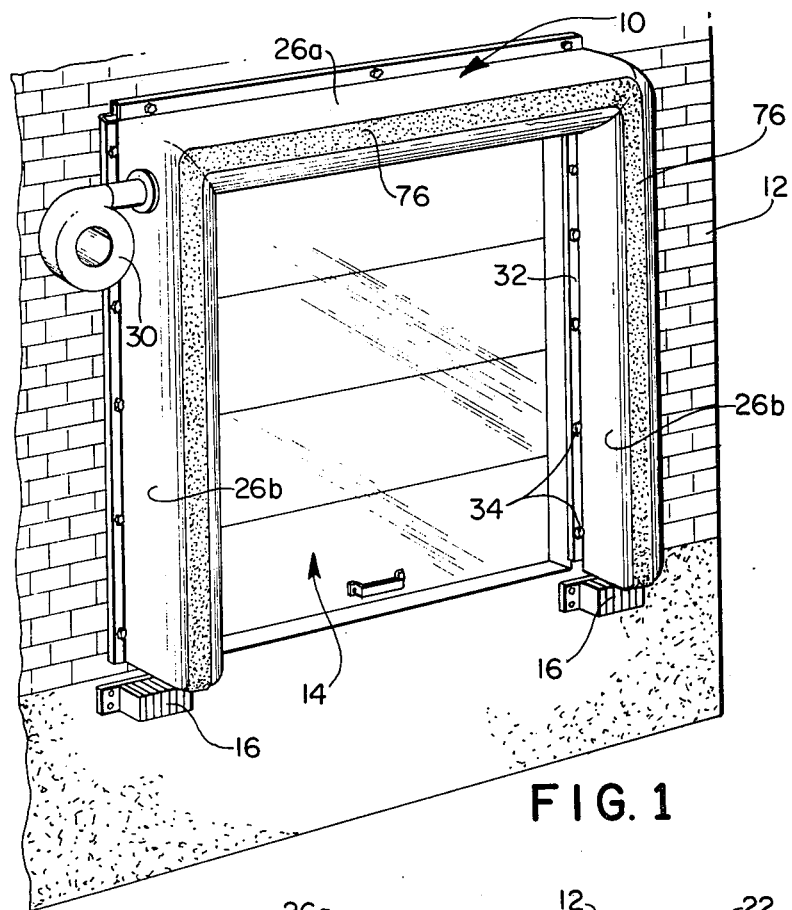
FIG. 1 is an isometric view of a loading dock opening with the sealing device of this invention mounted about the opening.

Referring to the drawings, FIG. 1, the docking seal 10 according to this invention is mounted on the wall 12 of the building about the docking opening which, as illustrated, is provided with a conventional overhead rollaway door 14. At the bottom of the opening on either side there are bumpers 16—16.

The docking seal has a rigid backing by means of which it is attached to the wall of the building about the docking opening and a yieldable facing held distended therefrom by air pressure introduced between the backing and the facing so as to form a continuous air chamber peripherally of the opening wherein the back wall of the chamber is constituted solely by the rigid backing and the front and side walls by the yieldable facing, i.e., the yieldable facing per se does not constitute a complete tube. The rigid backing comprises a top frame member 18, FIG. 2, adapted to be placed across the top of the opening, and side frame members 20—20 adapted to be placed along the opposite sides of the opening. The frame members are comprised of, for example, three pieces of exterior-grade plywood. The opposite ends of the top member 18 and the upper ends of the side members 20—20 are mitered and are connected to each other by hinge members 22—22.

Figure 3:
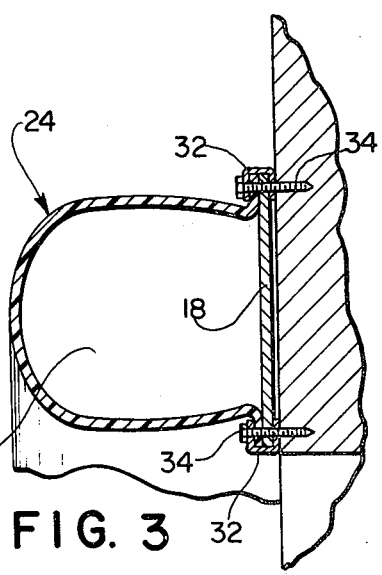
FIG. 3 is a section taken on line 3—3 of FIG. 2.
Figure 4:
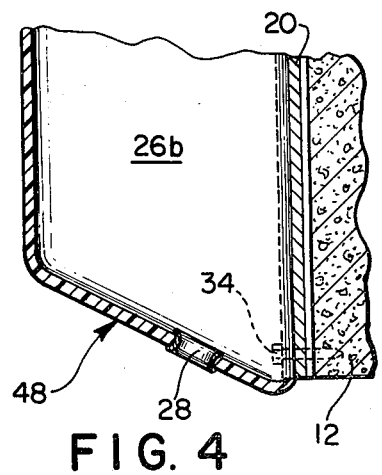
FIG. 4 is a section taken on line 4—4 of FIG. 2.

The yieldable facing is comprised of a vinyl-coated nylon fabric 24 of from 22-ounce to 40-ounce weight and is fastened at its edges to the faces of the frame members 18 and 20—20 all the way around so as to be coextensive therewith and to provide a continuous air chamber having horizontal and vertical chambers 26b—26b, FIG. 4, are tailored so as to slope downwardly and contain one or more openings in which are set grommets 28 through which condensation formed in the chamber may escape and also to permit some degree of air to flow out from the chamber. An opening is provided in the side wall of one of the horizontal or vertical chambers 26b as illustrated in FIG. 1 through which low-pressure air is continuously introduced into the chambers by means of a low-pressure blower 30. The edges of the vinyl fabric of the yieldable facing are attached to the frame members by channel-shaped strips 32, FIG. 3, within which the edges of the vinyl fabric and the edges of the frame members are clamped in tight engagement by any suitable means and attaching bolts 34 are inserted through the channel members and edges into the wall 12.

The hinged frame members of the rigid backing and the continuous one-piece vinyl-coated material of the facing constitute a unitary structure which is completed at its place of manufacture and ready to mount about the docking opening as a one-piece unit. Unlike conventional docking seals which are of tubular construction, the structure herein employed has a rigid flat back wall which makes it easy to install against the flat surface about the docking opening without special preparation, and a flexible facing designed to yield to provide the desired cushioning and seal without distortion of the backing. The articulated structure of the backing makes it possible to fold the frame members and deflated yieldable facing upon each other for ease of shipment.

Figure 6:
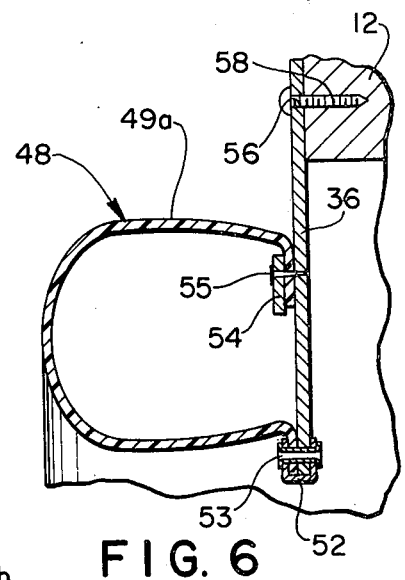
FIG. 6 is a section taken on line 6—6 of FIG. 5.
Figure 2:
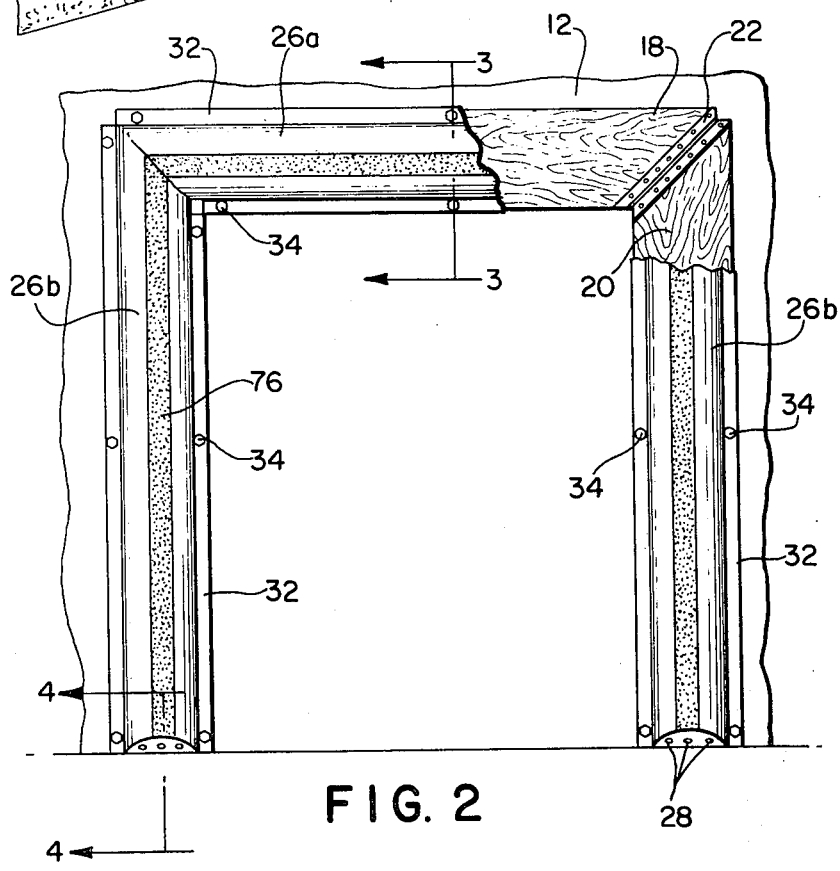
FIG. 2 is a front elevation of FIG. 1 with parts broken away.
Figure 5:
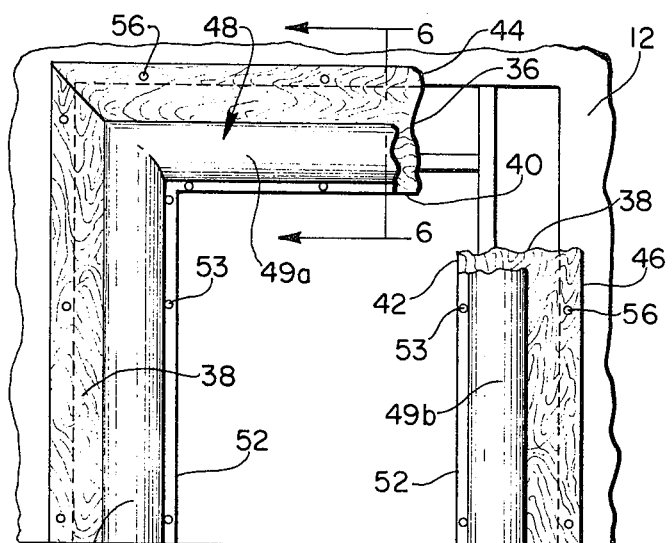
FIG. 5 is a front elevation of an alternative mounting for the seal with parts broken away.

As illustrated in FIGS. 1 through 3, the docking seal is constructed to be attached to the wall about the opening with the inner edges of the frame members coinciding, that is, flush with the inner sides of the opening. It may be desirable, however, to have the horizontal and vertical portions of the inflated chamber extend downwardly and inwardly from the top and sides of the opening so as to provide for vehicles having a smaller tailgate opening. If this is desired, the manufacturer provides frame members as shown in FIGS. 5 and 6 wherein the top framing member 36 and side framing members 38—38 have, respectively, inner edges 40 and 42—42 which are spaced downwardly and inwardly, respectively, from the top and sides of the docking opening and outer edges 44 and 46—46, respectively, which are spaced upwardly and outwardly of the top and sides of the opening, so that when the structure is applied to the wall of the building, portions of the framing members will extend downwardly and inwardly from the top and sides of the opening. When constructed in this fashion, the yieldable facing 48 comprising the vinyl-coated fabric is attached to the framing members with its inner edges coinciding with the inner edges of the framing members and its outer edges spaced inwardly from the outer edges of the framing members, as shown in FIG. 6, so as to form a continuous chamber about the opening comprising a horizontal portion 49a and a vertical portion 49b—49b. The inner edges of the facing 48 are attached to the inner edges of the frame members by U-shaped strips 52 similar to the aforesaid strips 32, and rivets 53 secure said strips and edges together. The outer edges of the facing 48 are folded inwardly and are clamped between furring strips 54 and frame 36, the entire assembly being secured by fastening means, such as nails 55. The frame members, outwardly of the chambers, are provided with openings 56 for receiving fastening elements 58 for securing the frame members to the wall 12.

Figure 7:
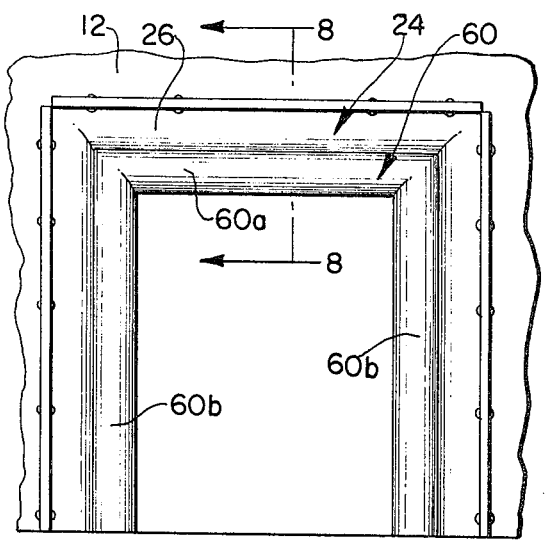
FIG. 7 is a front elevation of a docking seal provided with double inflatable chambers about the opening.
Figure 8:
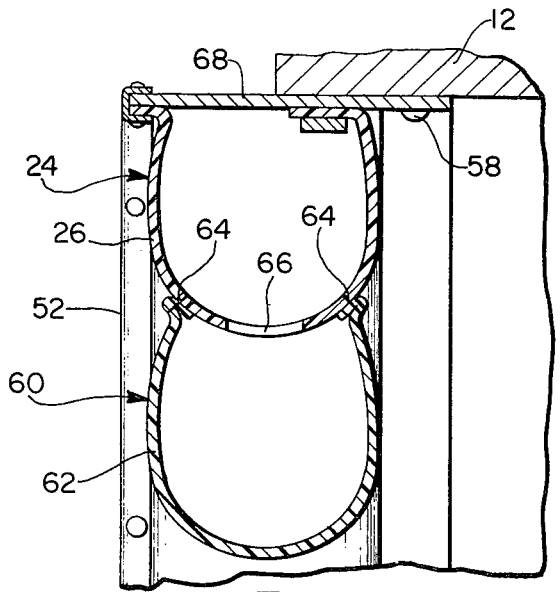
FIG. 8 is a section taken on line 8—8 of FIG. 7.

It may be desirable to extend the yieldable facing outwardly from the face of the docking opening to allow for trucks or trailers which have a rearwardly projecting ledge or platform at the back; and so, as shown in FIGS. 7 and 8, an additional chamber 60 comprised of vinyl-coated fabric 62 attached at its opposite edges by stitching 64, to the front wall of the chamber 26 as shown in FIG. 3, or to the front wall of chamber 48 as shown in FIG. 5, to provide a continuous outer chamber coextensive with the inner chamber comprising a horizontal portion 60a and vertical portions 60b—60b. Openings 66 are provided in the front wall of the chambers 26 or 48 through which air is supplied from the inner chamber to the outer chamber. As shown in FIG. 8, the double-structure chamber may be mounted on frame member 68 designed to extend into the opening as already described with reference to FIGS. 5 and 6 to restrict the opening to a size which is commensurate with the opening at the back of the truck or trailer which is expected to be delivering or receiving merchandise.

Figure 9:
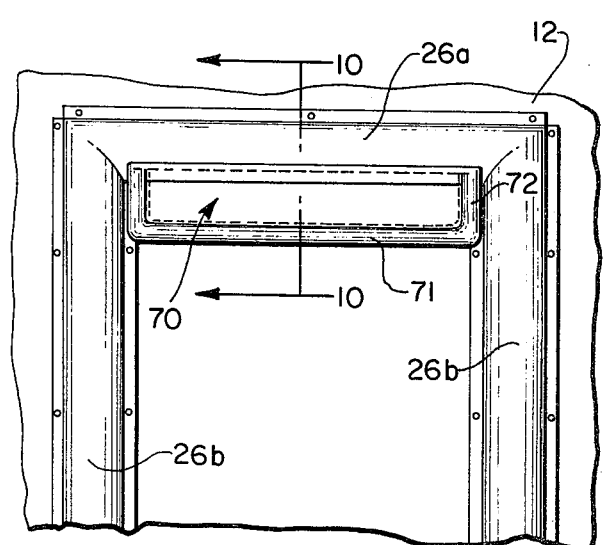
FIG. 9 is a fragmentary front view of the docking seal provided with a valance across the top.
Figure 10:
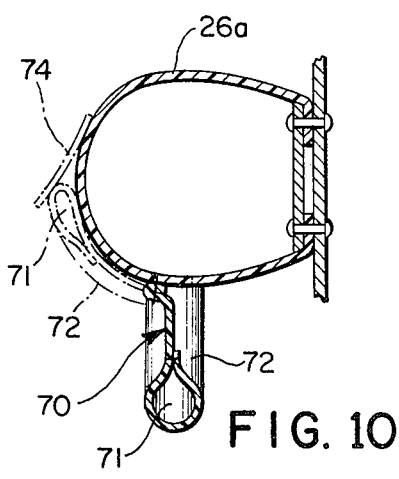
FIG. 10 is a section taken on line 10—10 of FIG. 9.
Figure 11:
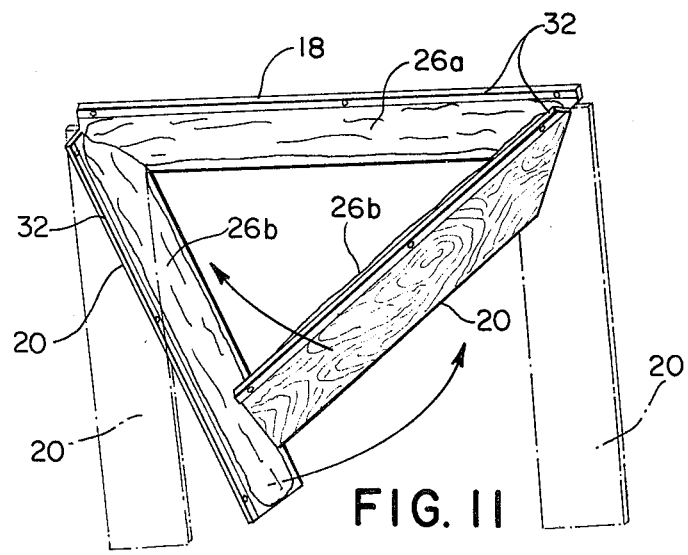
FIG. 11 shows the framing members with the inflatable chamber mounted thereon in partially folded relation.

It may also be desirable to provide a valance curtain 70 as shown in FIGS. 9 and 10 across the top of the opening. The valance is attached by stitching along its upper edge to the lower side of the chamber 26a and has at its lower edge an inflatable chamber 71. Tubular portions 72 extend downwardly from the chamber 26a to opposite ends of the chamber 71 so that the latter can be inflated simultaneously with the chamber at the top. If the valance is not required to be used, it may be drawn up and removably attached to the front of chamber 26a by tape or the like 74, as shown in broken lines in FIG. 10.

In order to facilitate backing a vehicle up to the docking seal, there may be provided on the front face of the top and side chambers a relatively broad 5 inch wide target strip 76, FIGS. 1 and 2, painted thereon or impregnated into the surface, said strip being of a bright color, or at least a contrasting color.

The docking seal is fabricated to accommodate the specific needs of a given truck or trailer to the docking opening with the inside dimensions, when inflated, smaller than the actual width and height of the opening of the vehicle. By so constructing the seal, the driver has a somewhat larger target area to guide him when backing his vehicle up to the opening.

The blower 30 for keeping the sealing assembly inflated may be a simple, low-volume centrifugal-type blower and may be connected to one of the horizontal or vertical chambers of the yieldable facing; however, it is within the scope of the invention to connect it to the chamber through an opening in the rigid backing, if desired, so that the blower can be located within the building rather than externally thereof. It will be understood that in operation the blower 30 will be continuously operating, and will maintain the yieldable facing inflated even though the latter is not airtight. More specifically, the continuous flow of air from blower 30 into the seal is sufficient to maintain the facing adequately inflated, even though air will be continuously escaping from the seal. Also, the seal of the present invention provides a uniform and relatively soft cushion that has been found to be highly desirable.

Other advantages of the docking seal of this invention reside in the fact that the structure may be constructed at the place of manufacture to specification for application, shipped in a collapsed form easy to handle, and easily installed without requiring alterations about the opening. A further advantage is that since the chamber is not in the form of a complete tube, the cost of construction and installation is considerably less expensive.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A docking seal for loading dock openings in a wall, comprising top and side frame members for mounting across the top and at opposite sides of the opening, a flexible wall attached along its edges to the frame members and held distended therefrom by air pressure continuously supplied to the space between the frame members and flexible wall, said frame members and flexible wall defining a continuous air chamber about the opening, characterized in that the back side of the chamber is constituted solely by the rigid frame members and the front side of the chamber is constituted solely by the flexible wall, the upper ends of said side frame members being hinged to the opposite ends of said top frame member so that the side frame members may be folded onto the top frame member.

2. A docking seal according to claim 1, wherein the upper ends of the side frame members and the opposite ends of the top frame members are mitered and there are hinges connecting the mitered ends of the side frame members to the mitered ends of the top frame member.

3. A docking seal according to claim 1, wherein the frame members are dimensioned so that when attached to the wall about the opening the inner edges extend downwardly and inwardly from the top and sides of the opening and wherein the flexible wall is attached to the frame member with its inner edges coinciding with the inner edges of the frame members so that the air chamber defines an opening which is smaller in width and height than the opening in the wall.

4. A ready-to-mount docking seal, comprising rigid frame members for mounting across the top and along the opposite sides of the opening, a flexible wall of predetermined width, means attaching the opposite edges of the flexible wall to the frame members at a lesser spacing than said predetermined width so that said flexible wall is adapted to be distended by supplying air pressure between the frame members and the flexible wall to form in conjunction with the frame members an air chamber, the back of which is constituted solely by the rigid frame members and the front of which is constituted solely by the flexible wall, and hinge means connecting the upper ends of the side frame members to the opposite ends of the top frame member such as to enable folding the frame members and the flexible wall.

5. A ready-to-mount dock seal according to claim 4, comprising U-shaped trim strips coextensive with the inner and outer edges of the flexible wall at the top and at the sides within which said edges are engaged, said U-shaped trim strips, the edges of the flexible wall, and the edges of the frame member containing registering openings for receiving attaching means for attaching the docking seal to the wall about the opening.

6. A ready-to-mount dock seal for loading dock openings in a wall, comprising a pair of vertically disposed, rigid frame members adapted to be mounted to the wall adjacent vertical edges of said opening, and a horizontal rigid frame member adapted to be mounted to the wall adjacent the top horizontal edge of said opening, means connecting said horizontal frame member to the upper ends of said vertical members whereby said frame members comprise a unitary assembly, a flexible wall attached along its edges to the frame members in spaced relation and adapted to be held distended therefrom by air pressure continuously supplied to the space between the frame members and the flexible wall, said frame members and flexible wall, when the latter is distended, being adapted to define a continuous air chamber about the opening, characterized in that the back side of the chamber is constituted solely by the rigid frame members and the front side of the chamber is constituted solely by the flexible wall.

7. In the dock seal of claim 6, means attaching the opposite edges of said flexible wall in substantially flush relation to the opposite edges of said frame members, said means comprising U-shaped trim strips extending longitudinally of said edges in clamping relation thereto, and spaced openings extending through said trim strip, the edges of the flexible wall and the edges of the frame members for receiving fastening means for attaching the dock seal to the wall about the opening.

8. In the dock seal of claim 6, the lower ends of the chamber at opposite sides thereof being inclined downwardly and inwardly from the front, said inclined portions having at least one opening therein for pressure relief and drainage purposes.

9. A ready-to-mount dock seal for loading dock openings in a wall, comprising a pair of vertically disposed, rigid frame members adapted to be mounted to the wall adjacent vertical edges of said opening, and a horizontal rigid frame member adapted to be mounted to the wall adjacent the top horizontal edge of said opening, means connecting said horizontal frame member to the upper ends of said vertical members whereby said frame members comprise a unitary assembly, said connecting means being operable to permit collapsing of said frame to facilitate shipment and storage of said assembly, a flexible wall attached along its edges to the frame members and held distended therefrom by air pressure continuously supplied to the space between the frame members and the flexible wall, said frame members and flexible wall defining a continuous air chamber about the opening, characterized in that the back side of the chamber is constituted solely by the rigid frame members and the front side of the chamber is constituted solely by the flexible wall.

10. In the dock seal of claim 9, means attaching the opposite edges of said flexible wall in substantially flush relation to the opposite edges of said frame members, said means comprising U-shaped trim strips extending longitudinally of said edges in clamping relation thereto, and spaced openings extending through said trim strip, the edges of the flexible wall and the edges of the frame members for receiving fastening means for attaching the dock seal to the wall about the opening.

11. In the dock seal of claim 9, the lower ends of the chamber at opposite sides thereof being inclined downwardly and inwardly from the front, said inclined portions having at least one opening therein for pressure relief and drainage purposes.

12. In combination, a loading dock comprising an opening in a wall, a dock seal comprising a pair of vertically disposed rigid frame members mounted to said wall adjacent vertical edges of said opening, and a horizontal rigid frame member mounted to said wall adjacent the top horizontal edge of said opening, said frame members each extending inwardly of the edges of said opening, a flexible wall attached along one of its edges to the inner edges of said frame members and along its opposite edge to the frame members at a location inwardly spaced from said frame members inner edges, means continuously supplying air pressure to the space between the frame members and the flexible wall to cause the latter to distend to define a continuous air chamber about the opening smaller in width and height than the opening, the back side of said chamber consisting solely of said rigid frame members and the front side thereof consisting solely of the flexible wall, and the inner edge of said air chamber being substantially flush with the inner edges of said frame members.

* * * * *